United States Patent [19]

Schrader et al.

[11] 3,846,514

[45] Nov. 5, 1974

[54] O-ALKYL-O-[4-(N-ALKYL-CARBAMOYL)-BENZALDOXIME]-(THIONO)(THIOL)PHOSPHORIC (PHOSPHONIC) ACID ESTERS

[75] Inventors: Gerhard Schrader, Wuppertal; Ingeborg Hammann, Cologne, both of Germany

[73] Assignee: Bayer Aktiengesellschaft, Leverkusen, Germany

[22] Filed: Aug. 13, 1973

[21] Appl. No.: 387,978

[30] Foreign Application Priority Data
Aug. 26, 1972 Germany.............................. 2242135

[52] U.S. Cl................. 260/938, 260/968, 424/211
[51] Int. Cl........................... A01n 9/36, C07f 9/16
[58] Field of Search............................ 260/938, 944

[56] References Cited
UNITED STATES PATENTS
2,816,128  12/1957  Allen ................................. 260/944

*Primary Examiner*—Lorraine A. Weinberger
*Assistant Examiner*—Richard L. Raymond
*Attorney, Agent, or Firm*—Burgess, Dinklage & Sprung

[57] ABSTRACT

O-alkyl-O-[4-(N-alkyl-carbamoyl)-benzaldoxime]-(thiono)(thiol) phosphoric (phosphonic) acid esters of the formula

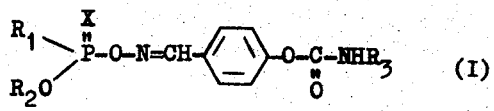

in which
$R_1$ is lower alkyl, lower alkoxy, lower alkylmercapto or phenyl,
$R_2$ and $R_3$ each independently is lower alkyl, and
X is oxygen or sulfur, which possess insecticidal, acaricidal and fungicidal properties.

7 Claims, No Drawings

O-ALKYL-O-[4-(N-ALKYL-CARBAMOYL)-BENZALDOXIME]-(THIONO)(THIOL)PHOSPHORIC (PHOSPHONIC) ACID ESTERS

The present invention relates to and has for its objects the provision of particular new 0-alkyl-0-[4-(N-alkyl-carbamoyl)-benzaldoxime]-(thiono)(thiol)phosphoric (phosphonic) acid esters which are optionally halogen-substituted on the benzene ring, which possess insecticidal, acaricidal and fungicidal properties, active compositions in the form of mixtures of such compounds with solid and liquid dispersible carrier vehicles, and methods for producing such compounds and for using such compounds in a new way especially for combating pests, e.g., insects, acarids and fungi, with other and further objects becoming apparent from a study of the within specification and accompanying examples.

It has been disclosed in German Patent Specification Nos. 1,238,902; 1,052,981 and 962,608 that certain thionophosphoric acid ester benzaldoximes, for example 0,0-diethyl-0-(methylbenzaldoxime)-thionophosphoric acid ester (Compound A), and phosphoric or thionophosphoric acid esters of cyclic dicarboxylic acid oximides, such as 0,0-diethylnaphthalic acid oximinothionophosphoric acid ester (Compound B), possess a certain insecticidal activity.

The present invention provides, as new compounds, the (thiono)phosphoric(phosphonic) acid ester benzldoximes of the general formula

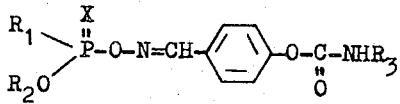

(I)

in which
R$_1$ is lower alkyl, lower alkoxy, lower alkylmercapto or phenyl,
R$_2$ and R$_3$ each independently is lower alkyl, and
X is oxygen or sulfur.

Preferably R$_1$ is alkyl, alkoxy or alkylmercapto with, in each case, one to four, especially one to three, carbon atoms (for example methyl, ethyl, n- or iso-propyl, methoxy, ethoxy, propoxy, methylmercapto, ethylmercapto or propylmercapto) or phenyl; R$_2$ and R$_3$ are each alkyl with one to four, especially one to three, carbon atoms; and X is sulfur.

Surprisingly, the (thiono)phosphoric(phosphonic) acid ester benzaldoximes according to this invention possess a substantially better insecticidal and acaricidal action than the prior-art thionophosphoric acid ester benzaldoximes of analogous structure and identical type of action. The new compounds thus represent a genuine enrichment of the art.

The present invention also provides a process for the preparation of a (thiono)phosphoric(phosphonic) acid ester benzaldoxime of the formula (I) in which a benzaldoxime derivative of the general formula

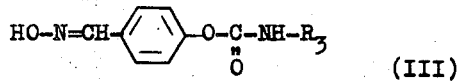

(III)

in which
R$_3$ has the above-mentioned meaning,
is reacted, in the form of an alkali metal salt, alkaline earth metal salt or ammonium salt thereof or in the presence of an acid-binding agent, with a (thiono)phosphoric(phosphonic) acid ester halide of the general formula

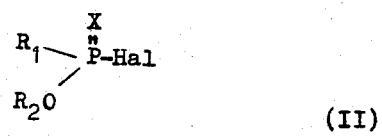

(II)

in which
R$_1$, R$_2$ and X have the above-mentioned meanings, and
Hal is halogen, preferably chlorine.

If 0,0-diethylthionophosphoric acid ester chloride and 4-(N-methylcarbamoyl)-benzaldoxime are used as starting materials, the course of the reaction can be represented by the following equation:

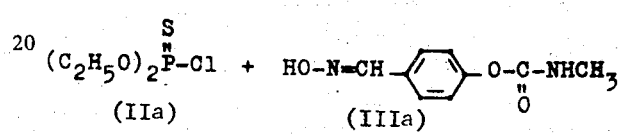

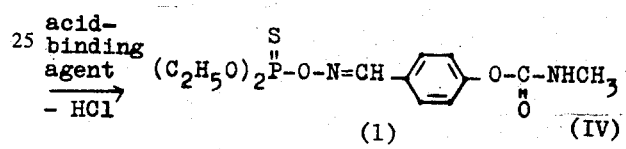

The following may be mentioned as examples of the (thiono)phosphoric(phosphonic) acid ester halides which can be used: 0,0-dimethyl-, 0,0-diethyl-, 0,0-dipropyl-, 0,0-di-isopropyl-, 0-methyl-0-ethyl-, 0-methyl-0-isopropyl-, 0-ethyl-0-isopropyl-, 0,0-dibutyl-, 0-methyl-0-butyl- or 0-isopropyl-0-butyl-(thiono)phosphoric acid ester chloride, and 0-methyl-methane-, 0-ethyl-propane-, 0-isopropyl-ethane-, 0-butyl-methane-, 0-methyl-isopropane-, 0-methyl-ethane-, 0-ethyl-ethane-, 0-ethyl-phenyl-, 0-propyl-methane-, 0-butyl-ethane, 0-methyl-butane-, 0-ethyl-isopropane-, 0-butyl-isopropane- or 0-butyl-butane-(thiono)phosphonic acid ester chloride.

The (thiono)phosphoric(phosphonic) acid ester halides (II) to be used as starting materials are known and can, like the 4-alkylcarbamoylbenzaldoximes, be prepared according to customary processes. The latter can be obtained, for example, from 4-hydroxybenzaldoxime by reaction with isocyanates.

The preparative process for the new compounds (I) is preferably carried out with the conjoint use of a suitable solvent or diluent. As such, practically all inert organic solvents can be used, especially aliphatic and aromatic, optionally chlorinated hydrocarbons, such as benzene, toluene, xylene, benzine, methylene chloride, chloroform, carbon tetrachloride and chlorobenzene; ethers, for example diethyl ether, dibutyl ether and dioxane; ketones, for example acetone, methyl ethyl ketone, methyl isopropyl ketone and methyl isobutyl ketone; and nitriles, such as acetonitrile and propionitrile.

All customary acid-acceptors can be used as acid-binding agents. Alkali metal carbonates and alkali metal alcoholates, such as sodium carbonate and potassium carbonate, sodium methylate or ethylate and potassium methylate or ethylate, as well as aliphatic, aromatic or heterocyclic amines, for example triethylamine, dimethylamine, dimethylaniline, dimethylbenzylamine and pyridine, have proved particularly successful.

The reaction temperature can be varied within a fairly wide range. In general, the reaction is carried out at from 20° to 100°C, preferably at from 40° to 75°C.

The reaction is in general carried out under normal pressure.

To carry out the process, the starting materials are in most cases employed in equimolar amounts. An excess of one or other reactant produces no significant advantages. The reaction is preferably carried out in the presence of one of the above-mentioned solvents and in the presence of an acid-acceptor, at the indicated temperatures, and after stirring for several hours the reaction mixture is worked up in the usual manner.

The compounds according to the invention are in some cases obtained in a crystalline form but in most cases in the form of colorless or slightly colored, viscous, water-insoluble oils which cannot be distilled without decomposition but can be freed of the last volatile constituents by so-called "slight distillation," that is to say prolonged heating to moderately elevated temperatures under reduced pressure, and can be purified in this manner.

They are usually characterized by the refractive index.

As has already been mentioned, the new (thiono)-phosphoric(phosphonic) acid ester benzaldoximes are distinguished by an outstanding insecticidal, include soil-insecticidal, and acaricidal activity, against plant pests, pests harmful to health and pests of stored products. Herein, they posses a good action against both sucking insects and biting insects and against mites (Acarina). At the same time they display a low phytotoxicity and also fungicidal properties.

For these reasons, the compounds according to the invention may be successfuly employed as pesticides in plant protection and the protection of stored products, and in the hygiene field.

To the sucking insects there belong, in the main, aphids (Aphididae) such as the green peach aphid (*Myzus persicae*), the bean aphid (*Doralis fabae*), the bird cherry aphid (*Rhopalosiphum padi*), the pea aphid (*Macrosiphum pisi*) and the potato aphid (*Macrosiphum solanifolii*), the currant gall aphid (Cryptomyzus korschelti), the rosy apple aphid (*Sappaphis mali*), the mealy plum aphid (Hyalopterus arundinis) and the cherry black-fly (*Myzus cerasi*); in addition, scales and mealybugs (Coccina), for example the oleander scale (*Aspidiotus hederae*) and the soft scale (*Lecanium hesperidum*) as well as the grape mealybug (*Pseudococcus maritimus*); thrips (Thysanoptera), such as *Hercinothrips femoralis*, and bugs, for example the beet bug (*Piesma quadrata*), the red cotton bug (*Dysdercus intermedius*), the bed bug (*Cimex lectularius*), the assassin bug (*Rhodnius prolixus*) and Chagas' bug (*Triatoma infestans*) and, further, cicadas, such as *Euscelis bilobatus* and *Nephotettix bipunctatus*.

In the case of the biting insects, above all there should be mentioned butterfly caterpillars (Lepidoptera) such as the diamond-back moth (*Plutella maculipennis*), the gypsy moth (*Lymantria dispar*), the browntail moth (*Euproctis chrysorrhoea*) and tent caterpillar (*Malacosoma neustria*); further, the cabbage moth (*Mamestra brassicae*) and the cutworm (*Agrotis segetum*), the large white butterfly (*Pieris brassicae*), the small winter moth (*Cheimatobia brumata*), the green oak tortrix moth (*Tortrix viridana*), the fall armyworm (*Laphygma frugiperda*) and cotton worm (*Prodenia litura*), the ermine moth (*Hyponomeuta padella*), the Mediterranean flour moth (*Ephestia kuhniella*) and greater wax moth (*Galleria mellonella*).

Also to be classed with the biting insects are beetles (Coleoptera), for example the granary weevil (*Sitophilus granarius = Calandra granaria*), the Colorado beetle (*Leptinotarsa decemlineata*), the dock beetle (*Gastrophysa viridula*), the mustard beetle (Phaedon cochleariae), the blossom beetle (*Meligethes aeneus*), the raspberry beetle (*Byturus tomentosus*), the bean weevil (*Bruchidius = Acanthoscelides obtectus*), the leather beetle (Dermestes frischi), the khapra beetle (*Trogoderma granarium*), the flour beetle (*Tribolium castaneum*), the northern corn billbug (*Calandra* or *Sitophilus zeamais*), the drugstore beetle (*Stegobium paniceum*), the yellow mealworm (*Tenebrio molitor*) and the saw-toothed grain beetle (*Oryzaephilus surinamensis*), and also species living in the soil, for example wireworms (Agriotes spec.) and larvae of the cockchafer (*Melolontha melolontha*); cockroaches, such as the German cockroach (*Blattella germanica*), American cockroach (*Periplaneta americana*), Madeira cockroach (Leucophaea or *Rhyparobia maderae*), oriental cockroach (*Blatta orientalis*), the giant cockroach (*Blaberus giganteus*) and the black giant cockroach (*Blaberus fuscus*) as well as *Henschoutedenia flexivitta*; further, Orthoptera, for example the house cricket (*Acheta domesticus*); termites such as the eastern subterranean termite (*Reticulitermes flavipes*) and Hymenoptera such as ants, for example the garden ant (*Lasius niger*).

The Diptera comprise essentially the flies, such as the vinegar fly (*Drosophila melanogaster*), the Mediterranean fruit fly (*Ceratitis capitata*), the house fly (*Musca domestica*), the little house fly (*Fannia canicularis*), the black blow fly (*Phormia regina*) and bluebottle fly (*Calliphora erythrocephala*) as well as the stable fly (*Stomoxys calcitrans*); further, gnats, for example mosquitoes such as the yellow fever mosquito (*Aedes aegypti*), the northern house mosquito (*Culex pipiens*) and the malaria mosquito (*Anopheles stephensi*).

With the mites (Acarina) there are classed, in particular, the spider mites (Tetranychidae) such as the two-spotted spider mite (*Tetranychus urticae*) and the European red mite (*Paratetranychus pilosus = Panonychus ulmi*), gall mites, for example the blackcurrant gall mite (*Eriophyes ribis*) and tarsonemids, for example the broad mite (*Hemitarsonemus latus*) and the cyclamen mite (*Tarsonemus pallidus*); finally, ticks, such as the relapsing fever tick (*Ornithodorus moubata*).

When applied against pests harmful to health and pests of stored products, particularly flies and mosquitoes, the process products are also distinguished by an outstanding residual activity on wood and clay, as well as a good stability to alkali on limed substrates.

The active compounds according to the instant invention can be utilized, if desired, in the form of the usual formulations or compositions with conventional inert (i.e., plant compatible or herbicidally inert) pesticide diluents or extenders, i.e., diluents, carriers or extenders of the type usable in conventional pesticide formulations or compositions, e.g., conventional pesticide dispersible carrier vehicles such as gases, solutions, emulsions, suspensions, emulsifiable concentrates, spray powders, pastes, soluble powders, dusting agents, granules, etc. These are prepared in known manner, for instance by extending the active compounds with conventional pesticide dispersible liquid diluent carriers and/or dispersible solid carriers optionally with the use of carrier vehicle assistants, e.g., conventional pesticide surface-active agents, including emulsifying agents and/or dispersing agents, whereby, for example, in the case where water is used as diluent, organic solvents may be added as auxiliary solvents. The following may be chiefly considered for use as conventional carrier vehicles for this purpose: aerosol propellants which are gaseous at normal temperatures and pressures, such as freon; inert dispersible liquid diluent carriers, including inert organic solvents, such as aromatic hydrocarbons (e.g., benzene, toluene, xylene, alkyl naphthalenes, etc.), halogenated, especially chlorinated, aromatic hydrocarbons (e.g., chlorobenzenes, etc.), cycloalkanes (e.g., cyclohexane, etc.), paraffins (e.g., petroleum or mineral oil fractions), chlorinated aliphatic hydrocarbons (e.g., methylene chloride, chloroethylenes, etc.), alcohols (e.g., methanol, ethanol, propanol, butanol, glycol, etc.) as well as ethers and esters thereof (e.g., glycol monomethyl ether, etc.), amines (e.g., ethanolamine, etc.), amides (e.g., dimethyl formamide, etc.), sulfoxides (e.g., dimethyl sulfoxide, etc.), acetonitrile, ketones (e.g., acetone, methyl ethyl ketone, methyl isobutyl ketone, cyclohexanone, etc.), and/or water; as well as inert dispersible finely divided solid carriers, such as ground natural minerals (e.g., kaolins, clays, alimina, silica, chalk, i.e., calcium carbonate, talc, attapulgite, montmorillonite, kieselguhr, etc.) and ground synthetic minerals (e.g., highly dispersed silicic acid, silicates, e.g., alkali silicates, etc.); whereas the following may be chiefly considered for use as conventional carrier vehicle assistants, e.g., surface-active agents, for this purpose: emulsifying agents, such as non-ionic and/or anionic emulsifying agents (e.g., polyethylene oxide esters of fatty acids, polyethylene oxide ethers of fatty alcohols, alkyl sulfates, alkyl sulfonates, aryl sulfonates, albumin hydrolyzates, etc., and especially alkyl aryl-polyglycol ethers, magnesium stearate, sodium oleate, etc.); and/or dispersing agents, such as lignin, sulfite waste liquors, methyl cellulose, etc.

Such active compounds may be employed alone or in the form of mixtures with one another and/or with such solid and/or liquid dispersible carrier vehicles and/or with other known compatible active agents, especially plant protection agents, such as other insecticides, acaricides and fungicides, or rodenticides, bactericides, nematocides, herbicides, fertilizers, growth-regulating agents, etc., if desired, or in the form of particular dosage preparations for specific application made therefrom, such as solutions, emulsions, suspensions, powders, pastes, and granules which are thus ready for use.

As concerns commercially marketed preparations, these generally contemplate carrier composition mixtures in which the active compound is present in an amount substantially between about 0.1–95 percent by weight, and preferably 0.5–90 percent by weight, of the mixture, whereas carrier composition mixtures suitable for direct application or field application generally contemplate those in which the active compound is present in an amount substantially between about 0.0001–10 percent, preferably 0.01–1 percent, by weight of the mixture. Thus, the present invention contemplates over-all compositions which comprises mixtures of a conventional dispersible carrier vehicle such as (1) a dispersible inert finely divided carrier solid, and/or (2) a dispersible carrier liquid such as an inert organic solvent and/or water preferably including a surface-active effective amount of a carrier vehicle assistant, e.g., a surface-active agent, such as an emulsifying agent and/or a dispersing agent, and an amount of the active compound which is effective for the purpose in question and which is generally between about 0.0001–95 percent, and preferably 0.01–95 percent, by weight of the mixture.

The active compounds can also be used in accordance with the well known ultra-low-volume process with good success, i.e., by applying such compound if normally a liquid, or by applying a liquid composition containing the same, via very effective atomizing equipment, in finely divided form, e.g., average particle diameter of from 50–100 microns, or even less, i.e., mist form, for example by airplane crop spraying techniques. Only up to at most about a few liters/hectare are needed, and often amounts only up to about 15 to 1000 g/hectare, preferably 40 to 600 g/hectare, are sufficient. In this process it is possible to use highly concentrated liquid compositions with said liquid carrier vehicles containing from about 20 to about 95 percent by weight of the active compound or even the 100 percent active substance alone, e.g., about 20–100 percent by weight of the active compound.

Furthermore, the present invention contemplates methods of selectively killing, combating or controlling pests, e.g., insects, acarids and fungi, and more particularly methods of combating at least one of insects and acarids, which comprises applying to at least one of correspondingly (a) such insects, (b) such acarids, (c) such fungi, and (d) the corresponding habitat thereof, i.e., the locus to be protected, a correspondingly combative or toxic amount, i.e., an insecticidally, acaricidally or fungicidally effective amount, of the particular active compound of the invention alone or together with a carrier vehicle as noted above. The instant formulations or compositions are applied in the usual manner, for instance by spraying, atomizing, vaporizing, scattering, dusting, watering, squirting, sprinkling, pouring, fumigating, dressing, encrusting, and the like.

It will be realized, of course, that the concentration of the particular active compound utilized in admixture with the carrier vehicle will depend upon the intended application. Therefore, in special cases it is possible to go above or below the aforementioned concentration ranges.

The synthesis, unexpected superiority and outstanding activity of the particular new compounds of the present invention are illustrated, without limitation, by the following examples:

EXAMPLE 1

Drosophila test
  Solvent: — 3 parts by weight of acetone
  Emulsifier: 1 part by weight of alkylaryl polyglycol ether To produce a suitable preparation of active compound, 1 part by weight of the active compound was mixed with the stated amount of solvent containing the stated amount of emulsifier, and the concentrate was diluted with water to the desired concentration.

1 ml of the preparation of the active compound was applied with a pipette to a filter paper disc of 7 cm diameter. The wet disc was placed in a glass vessel containing 50 vinegar flies (*Drosophila melanogaster*) and covered with a glass plate.

After the specified periods of time, the destruction was determined as a percentage: 100 percent means that all the flies were killed; 0 percent means that none of the flies were killed.

The active compounds, their concentrations, the evaluation times and the degree of destruction can be seen from the following Table 1:

To produce a suitable preparation of active compound, 1 part by weight of the active compound was mixed with the stated amount of solvent containing the stated amount of emulsifier and the concentrate was diluted with water to the desired concentration.

Cabbage leaves (*Brassica oleracea*) were sprayed with the preparation of the active compound until dripping wet and were infested with mustard beetle larvae (*Phaedon cochleariae*).

After the specified periods of time, the degree of destruction was determined in percent. 100 percent

TABLE 1
[*Drosophila* test]

| Active compound | | Active compound concentration in percent | Degree of destruction in percent after 1 day |
|---|---|---|---|
| (A) | $(C_2H_5O)_2\overset{S}{\overset{\|}{P}}-O-N=\overset{CH_3}{\overset{\|}{C}}-\underset{\text{(known)}}{\text{C}_6H_5}$ | 0.1<br>0.01 | 100<br>0 |
| (6) | $(CH_3O)_2\overset{S}{\overset{\|}{P}}-O-N=CH-\text{C}_6H_4-O-CO-NH-CH_3$ | 0.1<br>0.01 | 100<br>100 |
| (1) | $(C_2H_5O)_2\overset{S}{\overset{\|}{P}}-O-N=CH-\text{C}_6H_4-O-CO-NH-CH_3$ | 0.1<br>0.01 | 100<br>100 |
| (2) | $\begin{matrix}C_2H_5O\\C_2H_5\end{matrix}\overset{S}{\overset{\|}{P}}-O-N=CH-\text{C}_6H_4-O-CO-NH-CH_3$ | 0.1<br>0.01<br>0.001<br>0.0001 | 100<br>100<br>100<br>100 |
| (5) | $(i\text{-}C_3H_7O)_2\overset{S}{\overset{\|}{P}}-O-N=CH-\text{C}_6H_4-O-CO-NH-CH_3$ | 0.1<br>0.01 | 100<br>100 |

EXAMPLE 2

Phaedon larvae test
Solvent: — 3 parts by weight of acetone
Emulsifier: 1 part by weight of alkylaryl polyglycol ether means that all beetle larvae were killed and 0 percent means that no beetle larvae were killed.

The active compounds, the active compound concentrations, the times of evaluation and the results can be seen from the following Table 2:

TABLE 2
[*Phaedon* larvae test]

| Active compound | | Active compound concentration in percent | Degree of destruction in percent after 3 days |
|---|---|---|---|
| (A) | $(C_2H_5O)_2\overset{S}{\overset{\|}{P}}-O-N=\overset{CH_3}{\overset{\|}{C}}-\text{C}_6H_5$ (known) | 0.1<br>0.01 | 20<br>0 |
| (6) | $(CH_3O)_2\overset{S}{\overset{\|}{P}}-O-N=CH-\text{C}_6H_4-O-CO-NH-CH_3$ | 0.1<br>0.01 | 100<br>90 |
| (1) | $(C_2H_5O)_2\overset{S}{\overset{\|}{P}}-O-N=CH-\text{C}_6H_4-O-CO-NH-CH_3$ | 0.1<br>0.01<br>0.001 | 100<br>100<br>65 |
| (2) | $\begin{matrix}C_2H_5O\\C_2H_5\end{matrix}\overset{S}{\overset{\|}{P}}-O-N=CH-\text{C}_6H_4-O-CO-NH-CH_3$ | 0.1<br>0.01<br>0.001 | 100<br>100<br>30 |
| (3) | $\begin{matrix}C_2H_5O\\C_6H_5\end{matrix}\overset{S}{\overset{\|}{P}}-O-N=CH-\text{C}_6H_4-O-CO-NH-CH_3$ | 0.1<br>0.01 | 100<br>100 |
| (4) | $\begin{matrix}C_2H_5O\\n\text{-}C_3H_7S\end{matrix}\overset{S}{\overset{\|}{P}}-O-N=CH-\text{C}_6H_4-O-CO-NH-CH_3$ | 0.1<br>0.01 | 100<br>100 |

EXAMPLE 3

Plutella test

Solvent: — 3 parts by weight of acetone

Emulsifer: 1 part by weight of alkylaryl polyglycol ether

To produce a suitable preparation of active compound, 1 part by weight of the active compound was mixed with the stated amount of solvent containing the stated amount of emulsifier and the concentrate was diluted with water to the desired concentration.

Cabbage leaves (*Brassica oleracea*) were sprayed with the preparation of the active compound until dew moist and were then infested with caterpillars of the diamond-back moth (*Plutella maculipennis*).

After the specified periods of time, the degree of destruction was determined as a percentage: 100 percent means that all the caterpillars were killed whereas 0 percent means that none of the caterpillars were killed.

The active compounds, the concentrations of the active compounds, the evaulation times and the results can be seen from the following Table 3:

EXAMPLE 4

Myzus test (contact action)

Solvent: — 3 parts by weight of acetone

Emulsifier: 1 part by weight of alkylaryl polyglycol ether

To produce a suitable preparation of active compound, 1 part by weight of the active compound was mixed with the stated amount of solvent containing the stated amount of emulsifier and the concentrate was diluted with water to the desired concentration.

Cabbage plants (*Brassica oleracea*) which had been heavily infested with peach aphids (*Myzus persicae*) were sprayed with the preparation of the active compound until dripping wet.

After the specified periods of time, the degree of destruction was determined as a percentage: 100 percent means that all the aphids were killed whereas 0 percent means that none of the aphids were killed.

The active compounds, the concentrations of the active compounds, the evaluation times and the results can be seen from the following Table 4:

TABLE 3
[*Plutella* test]

| Active compound | Active compound concentration in percent | Degree of destruction in percent after 3 days |
|---|---|---|
| (A) $(C_2H_5O)_2\overset{S}{\overset{\|}{P}}-O-N=\overset{CH_3}{\underset{\|}{C}}-C_6H_5$ (known) | 0.1<br>0.01 | 100<br>10 |
| (6) $(CH_3O)_2\overset{S}{\overset{\|}{P}}-O-N=CH-C_6H_4-O-CO-NH-CH_3$ | 0.1<br>0.01 | 100<br>100 |
| (1) $(C_2H_5O)_2\overset{S}{\overset{\|}{P}}-O-N=CH-C_6H_4-O-CO-NH-CH_3$ | 0.1<br>0.01<br>0.001 | 100<br>100<br>100 |
| (2) $\underset{C_2H_5}{\overset{C_2H_5O}{\diagdown}}\overset{S}{\overset{\|}{P}}-O-N=CH-C_6H_4-O-CO-NH-CH_3$ | 0.1<br>0.01<br>0.001 | 100<br>100<br>100 |
| (3) $\underset{C_6H_5}{\overset{C_2H_5O}{\diagdown}}\overset{S}{\overset{\|}{P}}-O-N=CH-C_6H_4-O-CO-NH-CH_3$ | 0.1<br>0.01<br>0.001 | 100<br>100<br>90 |
| (4) $\underset{n\text{-}C_3H_7S}{\overset{C_2H_5O}{\diagdown}}\overset{S}{\overset{\|}{P}}-O-N=CH-C_6H_4-O-CO-NH-CH_3$ | 0.1<br>0.01<br>0.001 | 100<br>100<br>100 |
| (5) $(i\text{-}C_3H_7O)_2\overset{S}{\overset{\|}{P}}-O-N=CH-C_6H_4-O-CO-NH-CH_3$ | 0.1<br>0.01 | 100<br>100 |

TABLE 4
[*Myzus* test]

| Active compound | Active compound concentration in percent | Degree of destruction in percent after 1 day |
|---|---|---|
| (A) $(C_2H_5O)_2\overset{S}{\overset{\|}{P}}-O-N=\overset{CH_3}{\underset{\|}{C}}-C_6H_5$ (known) | 0.1<br>0.01 | 60<br>0 |
| (2) $\underset{C_2H_5}{\overset{C_2H_5O}{\diagdown}}\overset{S}{\overset{\|}{P}}-O-N=CH-C_6H_4-O-CO-NH-CH_3$ | 0.1<br>0.01 | 100<br>75 |
| (4) $\underset{n\text{-}C_3H_7S}{\overset{C_2H_5O}{\diagdown}}\overset{S}{\overset{\|}{P}}-O-N=CH-C_6H_4-O-CO-NH-CH_3$ | 0.1<br>0.01 | 100<br>100 |

EXAMPLE 5

Tetranychus test (resistant)

Solvent: — 3 parts by weight of acetone
Emulsifier: 1 part by weight of alkylaryl polyglycol ether To produce a suitable preparation of active compound, 1 part by weight of the active compound was mixed with the stated amount of solvent containing the stated amount of emulsifier and the concentration was diluted with water to the desired concentration.

Bean plants (*Phaseolus vulgaris*), which had a height of approximately 10–30 cm, were sprayed with the preparation of the active compound until dripping wet. These bean plants were heavily infested with the two-spotted spider mite (*Tetranychus urticae*) in all stages of development. none After the specified periods of time, the effectiveness of the preparation of active compound was determined by counting the dead mites. The degree of destruction thus obtained was expressed as a percentage: 100 percent means that all the spider mites were killed, whereas 0 percent means that none of the spider mites were killed.

The active compounds, the concentrations of the active compounds, the evaluation times and the results can be seen from the following Table 5:

0.4 molar batch:

78 g of 4-(N-methylcarbamoyl)-benzaldoxime were dissolved in 400 ml of acetonitrile. 63 g of dry powdered potassium carbonate were added to this solution followed by 76 g of O,O-diethyl-thionophosphoric acid ester chloride, added dropwise at 60°C while stirring. The reaction mixture was subsequently warmed to 65°C for 2 hours. The batch was then diluted with 400 ml of benzene. The benzene solution was twice washed with 100 ml of ice-water at a time and was subsequently dried over sodium sulfate and distilled fractionally.

113 g (82 percent of theory) of O,O-diethyl-O-[4-(N-methylcarbamoyl)-benzaldoxime]-thionophosphoric acid ester were thus obtained as a pale yellow, water-insoluble oil with a refractive index $n_D^{28}$ of 1.5414.

| Calculated for a molecular weight of 346: | Found: |
|---|---|
| P 9.0% | 9.2% |
| S 9.3% | 9.0% |
| N 8.1% | 8.0% |

EXAMPLE 7

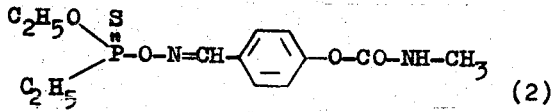

(2)

TABLE 5
[*Tetranychus* test/resistant]

| Active compound | | Active compound concentration in percent | Degree of destruction in percent after 2 days |
|---|---|---|---|
| (B) | 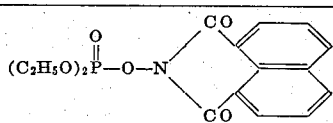 (known) | 0.1 | 0 |
| (4) | 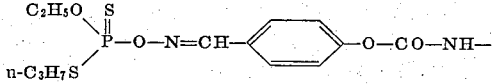 | 0.1 | 100 |

The process of this invention is illustrated in the following preparative Examples.

EXAMPLE 6 a) 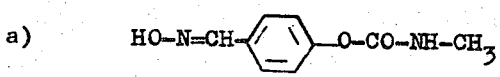

0.5 molar batch:

69 g of 4-hydroxybenzaldoxime were dissolved in 400 ml of acetonitrile, with the addition of 0.5 g of triethylamine. 31 g of methylisocyanate — dissolved in 31 ml of acetonitrile — were added dropwise to this solution at 20°C, while stirring, and the mixture was stirred for 12 hours at room temperature. Thereafter, 4-(N-methycarbamoyl)-benzaldoxime separated out. It was filtered off and recrystallized from ethanol. The yield was 70 g (71 percent of theory) and the melting point was 150°C.

b) 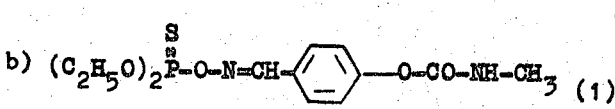 (1)

Under the same conditions as in Example 6, 78 g of 4-(N-methylcarbamoyl)-benzaldoxime and 69 g of O-ethyl-ethanethionophosphonic acid ester chloride yielded 101 g (77 percent of theory) of O-ethyl-ethane-O-[4-N-methylcarbamoyl)-benzaldoxime]-thionophosphonic acid ester with a refractive index $n_D^{28}$ of 1.5600.

| Calculated for a molecular weight of 330: | Found: |
|---|---|
| P 9.4% | 9.5% |
| S 9.7% | 9.8% |
| N 8.5% | 8.3% |

EXAMPLE 8

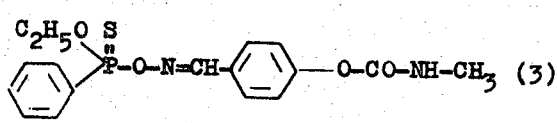 (3)

0.4 molar batch:

78 g of 4-(N-methylcarbamoyl)-benzaldoxime were dissolved in 400 ml of acetonitrile. 60 g of potassium carbonate were added to this solution, and 83 g of 0-ethyl-phenylthionophosphonic acid ester chloride were then added dropwise at 60°C, while stirring. The reaction mixture was additionally warmed to 70°C for 2 hours and was then worked up as described in Example 6.

126 g (83 percent of theory) of 0-ethyl-phenyl-0-[4-(N-methylcarbamoyl)-benzaldoxime]-thionophosphonic acid ester were thus obtained as a colorless, water-insoluble oil with a refractive index $n_D^{28}$ of 1.5994.

| Calculated for a molecular weight of 378: | Found: |
|---|---|
| P 8.2% | 8.2% |
| S 8.5% | 8.4% |
| N 7.4% | 7.3% |

EXAMPLE 9

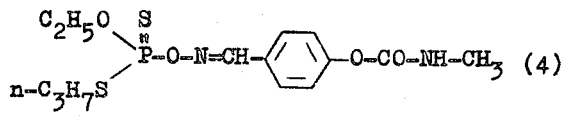

0.119 molar batch:

20 g of potassium carbonate were added to a solution of 23 g of 4-(N-methylcarbamoyl)-benzaldoxime in 200 ml of acetonitrile. 26 g of 0-ethyl-S-n-propyl-thionothiolphosphoric acid ester chloride were then added dropwise at 60°C, while stirring. After warming to 70°C for 2 hours, the batch was worked up as in Example 6.

30 g (67 percent of theory) of 0-ethyl-S-n-propyl-0-[4-(N-methylcarbamoyl)-benzaldoxime]-thionothiolphosphoric acid ester with a refractive index $n_D^{24}$ of 1.5784 were thus obtained.

| Calculated for a molecular weight of 376: | Found: |
|---|---|
| P 8.25% | 8.20% |
| S 17.00% | 17.20% |
| N 7.45% | 7.56% |

The following compounds were obtained by analogous methods:

Yield: 72 percent of theory
Melting point: 140°C

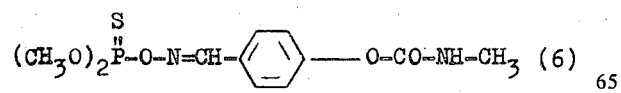

Yield: 46 percent of theory
Melting point: 175°C

Other compounds which can be prepared similarly include 0-n-propyl-0-n-butyl-0-[4-(N-isopropyl-carbamoyl)-benzaldoxime]-phosphoric acid ester, 0-ethyl-0-[4-(N-ethyl-carbamoyl)-benzaldoxime]-butanephosphonic acid ester, 0-methyl-S-methyl-0-[4-(N-methyl-carbamoyl)benzaldoxime]-thionothiolphosphoric acid ester, and the like.

It will be appreciated that the instant specification and examples are set forth by way of illustration and not limitation, and that various modifications and changes may be made without departing from the spirit and scope of the present invention.

What is claimed is:

1. A (thiono)phosphoric(phosphonic) acid ester of a benzaldoxime of the formula

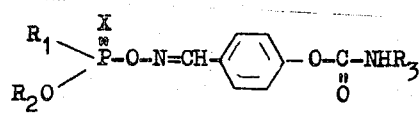

in which
$R_1$ is lower alkyl, lower alkoxy, lower alkylmercapto or phenyl,
$R_2$ and $R_3$ each independently is lower alkyl, and
X is oxygen or sulfur.

2. A compound according to claim 1, in which $R_1$ is alkyl, alkoxy or alkylmercapto of 1 to 3 carbon atoms or phenyl; $R_2$ and $R_3$ are each alkyl of 1 to 3 carbon atoms; and X is sulfur.

3. The compound according to claim 1 wherein such compound is 0,0-diethyl-0-[4-(N-methyl-carbamoyl)-benzaldoxime]-thionophosphoric acid ester of the formula

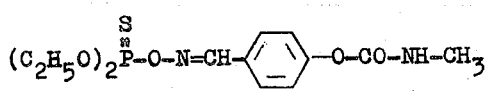

4. The compound according to claim 1, wherein such compound is 0-ethyl-0-[4-(N-methyl-carbamoyl)-benzaldoxime]-ethanethionophosphonic acid ester of the formula

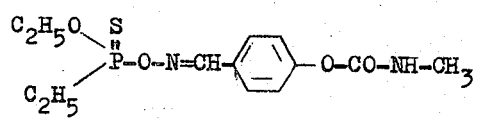

5. The compound according to claim 1 wherein such compound is 0-ethyl-0-[4-(N-methyl-carbamoyl)-benzaldoxime]-benzenethionophosphonic acid ester of the formula

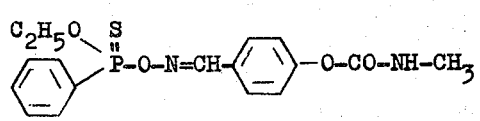

6. The compound according to claim 1 wherein such compound is O-ethyl-S-n-propyl-O-[4-(N-methyl-carbamoyl)-benzaldoxime]-thionothiolphosphoric acid ester of the formula
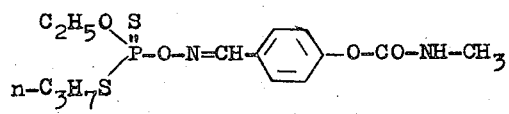
7. The compound according to claim 1 wherein such compound is O,O-dimethyl-O-[4-(N-methyl-carbamoyl)-benzaldoxime]-thionophosphoric acid ester of the formula
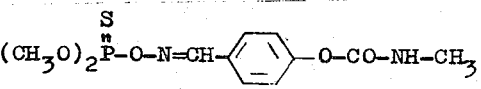
* * * * *